United States Patent
Muralidharan et al.

(10) Patent No.: US 12,417,403 B2
(45) Date of Patent: Sep. 16, 2025

(54) BAYESIAN OPTIMIZATION OF SPARSITY RATIOS IN MODEL COMPRESSION

(71) Applicant: NVIDIA CORPORATION, Santa Clara, CA (US)

(72) Inventors: Saurav Muralidharan, San Jose, CA (US); Vinu Joseph, Salt Lake City, UT (US); Animesh Garg, Berkeley, CA (US); Michael Garland, Lake Elmo, MN (US)

(73) Assignee: NVIDIA CORPORATION, Santa Clara, CA (US)

( * ) Notice: Subject to any disclaimer, the term of this patent is extended or adjusted under 35 U.S.C. 154(b) by 1270 days.

(21) Appl. No.: 16/785,044

(22) Filed: Feb. 7, 2020

(65) Prior Publication Data
US 2021/0065052 A1 Mar. 4, 2021

Related U.S. Application Data

(60) Provisional application No. 62/891,897, filed on Aug. 26, 2019.

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC .......... G06N 20/00; G06N 7/005; G06N 7/00; G06N 7/01
See application file for complete search history.

(56) References Cited

U.S. PATENT DOCUMENTS

| | | | |
|---|---|---|---|
| 2019/0340510 A1* | 11/2019 | Li | G06N 3/082 |
| 2020/0026967 A1 | 1/2020 | Kartoun et al. | |
| 2020/0293876 A1* | 9/2020 | Phan | H03M 7/702 |
| 2021/0247744 A1* | 8/2021 | Fahrenkopf | G06N 7/005 |

FOREIGN PATENT DOCUMENTS

| | | | |
|---|---|---|---|
| CN | 108062587 A | 5/2018 |
| CN | 110197257 A | 9/2019 |
| CN | 110309919 A | 10/2019 |

OTHER PUBLICATIONS

Animesh Garg, "Autonomous Palpation for Tumor Localization: Design of a Palpation Probe and Gaussian Process Adaptive Sampling," Thesis (2016) (Year: 2016).*

(Continued)

*Primary Examiner* — Kakali Chaki
*Assistant Examiner* — Kevin L. Smith
(74) *Attorney, Agent, or Firm* — Artegis Law Group, LLP

(57) ABSTRACT

One embodiment of a method includes determining, by a Bayesian optimizer, a first sparsity ratio associated with a limit on an accuracy loss caused by compressing the machine learning model. The method further includes selecting, by the Bayesian optimizer, a second sparsity ratio that optimizes a predefined objective function for the machine learning model within a search space bounded by the first sparsity ratio. The method further includes generating a compressed version of the machine learning model having the second sparsity ratio.

20 Claims, 5 Drawing Sheets

(56) References Cited

OTHER PUBLICATIONS

Wu et al., "Deep Deterministic Policy Gradient with Clustered Prioritized Sampling," Springer (2018) (Year: 2018).*
Zhao et al., "Adaptive Device Aware Model Optimization Framework," (2019) (Year: 2019).*
Zhu et al., "To prune, or not to prune: exploring the efficacy of pruning for model compression," arXiv (2017) (Year: 2017).*
Abadi et al., "Tensorflow: a system for large-scale machine learning", https://www.usenix.org/conference/osdi16/technical-sessions/presentation/abadi, In Operating Systems Design and Implementation, vol. 16, Nov. 2-4, 2016, 21 pages.
Anwar et al., "Compact deep convolutional neural networks with coarse pruning", arXiv:1610.09639, Oct. 30, 2016, 10 pages.
Bogunovic et al., "Truncated variance reduction: A unified approach to bayesian optimization and level-set estimation", In Advances in neural information processing systems, arXiv:1610.07379v1, Oct. 24, 2016, 17 pages.
Brochu et al., "A Tutorial on Bayesian Optimization of Expensive Cost Functions, with Application to Active User Modeling and Hierarchical Reinforcement Learning", arXiv:1012.2599, Dec. 12, 2010, 49 pages.
Carreira-Perpinán, Miguel A, "Model compression as constrained optimization, with application to neural nets. part I: General framework", Electrical Engineering and Computer Science, University of California, Merced arXiv:1707.01209, Jul. 4, 2017, 23 pages.
Carreira-Perpinán et al., "Learning-Compression" Algorithms for Neural Net Pruning, In Proceedings of the IEEE Conference on Computer Vision and Pattern Recognition, doi: 10.1109/CVPR. 2018.00890, Jun. 18-23, 2018, pp. 8532-8541.
Chen et al., "Mxnet: A flexible and efficient machine learning library for heterogeneous distributed systems". arXiv:1512.01274, Dec. 3, 2015, pp. 1-6.
Dai et al., "Chamnet: Towards efficient network design through platform-aware model adaptation", In Proceedings of the IEEE Conference on Computer Vision and Pattern Recognition, 2019, pp. 11398-11407.
Deng et al., "Imagenet: A large-scale hierarchical image database", IEEE conference on computer vision and pattern recognition, 2009, pp. 248-255.
Denton et al., "Exploiting Linear Structure Within Convolutional Networks for Efficient Evaluation", In Advances in neural information processing systems, 2014, pp. 1269-1277.
Dong et al., "More is less: A more complicated network with less inference complexity". In Proceedings of the IEEE Conference on Computer Vision and Pattern Recognition, arXiv:1703.08651v2, May 15, 2017, pp. 5840-5848.
Fmfn. A Python implementation of global optimization with Gaussian processes. https://github.com/fmfn/BayesianOptimization, 2019, 16 pages.
Frankle et al., "The lottery ticket hypothesis: Training pruned neural networks", Published as a conference paper at International Conference on Learning Representations, arXiv:1803.03635, Mar. 4, 2019, pp. 1-42.
Garg et al., "Tumor Localization using Automated Palpation with Gaussian Process Adaptive Sampling". In 2016 IEEE International Conference on Automation Science and Engineering (CASE), Aug. 21-24, 2016, pp. 194-200.
Girshick, Ross., "Fast R-CNN", In Proceedings of the IEEE international conference on computer vision, DOI 10.1109/ICCV.2015. 169, 2015, pp. 1440-1448.
Gong et al., "Compressing deep convolutional networks using vector quantization", Under review as a conference paper at International Conference on Learning Representations 2015, arXiv:1412. 6115, Dec. 18, 2014, 10 pages.
Google. TensorFlow model optimization toolkit. https://github.com/tensorflow/model-optimization, 2019, 3 pages.
Gray et al., "GPU Kernels for Block-SparseWeights", arXiv:1711. 09224, https://github.com/openai/blocksparse, 2017, pp. 1-12.

Gupta et al., "Deep Learning with Limited Numerical Precision", In International Conference on Machine Learning, arXiv:1502. 02551v1, Feb. 9, 2015, pp. 1737-1746.
Han et al., "Deep compression: Compressing deep neural networks with pruning, trained quantization and huffman coding", Published as a conference paper at International Conference on Learning Representations 2016, arXiv:1510.00149, Feb. 15, 2016, pp. 1-14.
Han et al., "Learning both weights and connections for efficient neural network". In Advances in neural information processing systems, arXiv:1510.00149v5, Feb. 15, 2016, pp. 1135-1143.
Han et al., "EIE: Efficient Inference Engine on Compressed Deep Neural Network", In 2016 ACM/IEEE 43rd Annual International Symposium on Computer Architecture (ISCA), DOI 10.1109/ISCA. 2016.30, 2016, pp. 243-254.
Han et al., "ESE: Efficient Speech Recognition Engine with Sparse LSTM on FPGA", In Proceedings of the 2017 ACM/SIGDA International Symposium on Field-Programmable Gate Arrays, DOI: http://dx.doi.org/10.1145/3020078.3021745, 2017, pp. 75-84.
He et al., "Deep Residual Learning for Image Recognition", In Proceedings of the IEEE conference on computer vision and pattern recognition, DOI 10.1109/CVPR.2016.90, 2016, pp. 770-778.
He et al., "Channel Pruning for Accelerating Very Deep Neural Networks", In International Conference on Computer Vision (ICCV), vol. 2, 2017, pp. 1389-1397.
He et al., "Progressive deep neural networks acceleration via soft filter pruning", Submitted to IEEE Transactions on neural networks and Learning Systems, arXiv:1808.07471, 2018, pp. 1-12.
He et al., "AMC: AutoML for Model Compression and Acceleration on Mobile Devices", In Proceedings of the European Conference on Computer Vision (ECCV), 2018, pp. 784-800.
Hu et al., "Network trimming: A data-driven neuron pruning approach towards efficient deep architectures", arXiv:1607.03250, Jul. 12, 2016, 9 pages.
Huang et al., "Densely connected convolutional networks", In 2017 IEEE Conference on Computer Vision and Pattern Recognition (CVPR), DOI 10.1109/CVPR.2017.243, 2017., pp. 2261-2269.
Jaderberg et al., "Speeding up Convolutional Neural Networks with Low Rank Expansions", arXiv:1405.3866, May 15, 2014, pp. 1-12.
Jones, Donald. R., "A Taxonomy of Global Optimization Methods Based on Response Surfaces", Journal of global optimization, 21(4), 2001, pp. 345-383.
Jones et al., "Lipschitzian optimization without the lipschitz constant", Journal of optimization Theory and Applications, vol. 79, No. 1, Oct. 1993, pp. 157-181.
Krizhevskyt et al., "The cifar-10 dataset", online: http://www.cs.toronto.edu/kriz/cifar.html, 55, 2014, 6 pages.
Kushner, H. J., "A new method of locating the maximum point of an arbitrary multipeak curve in the presence of noise", Journal of Basic Engineering, vol. 86, No. 1, 1964, pp. 97-106.
Lebedev et al., Speeding-up convolutional neural networks using fine-tuned cp-decomposition, Published as a conference paper at ICLR 2015, arXiv:1412.6553, Apr. 24, 2015, pp. 1-12.
Li et al., "Pruning Filters for Efficient Convnets", Published as a conference paper at International Conference on Learning Representations, 2017, Supported in part by the NSF under Grant IIS-13-2079, arXiv:1608.08710, 2016, pp. 1-13.
Liu et al., "Autoslim: An automatic dnn structured pruning framework for ultra-high compression rates", arXiv:1907.03141, Sep. 11, 2019, pp. 1-10.
Lizotte, D.J., "Practical bayesian optimization" University of Alberta, 2008.
Luo et al., "Thinet: A filter level pruning method for deep neural network compression", arXiv:1707.06342, 2017, pp. 5058-5066.
Merity et al., "Pointer sentinel mixture models", arXiv:1609.07843, Sep. 26, 2016, pp. 1-13.
Mockus, J., Application of bayesian approach to numerical methods of global and stochastic optimization, Journal of Global Optimization, vol. 4 No. 4, 1994, pp. 347-365.
Mockus et al., "The application of bayesian methods for seeking the extremum", Towards global optimization, 1978, pp. 117-129.
Molchanov et al., "Pruning convolutional neural networks for resource efficient inference", Published as a conference paper at

(56) References Cited

OTHER PUBLICATIONS

International Conference on Learning Representations, 2017, arXiv:1611.06440, Jun. 8, 2017, pp. 1-17.
Paszke et al., "Automatic differentiation in PyTorch", 31st Conference on Neural Information Processing Systems (NIPS 2017), Long Beach, CA, USA., 2017, pp. 1-4.
Polyak et al., "Channel-level acceleration of deep face representations", Special Section on Applying Four Ds of Machine Learning to advance Biometrics, DOI 10.1109/ACCESS.2015.2494536, vol. 3, Oct. 26, 2015, pp. 2163-2175.
Rasmussen et al., "Gaussian processes for machine learning", the mit press, 2006, pp. 1-266.
Simonyan et al., "Very deep convolutional networks for large-scale image recognition", Published as a conference paper at International Conference on Learning Representations, 2015, arXiv:1409.1556, Apr. 10, 2015, pp. 1-14.
Snoek et al., "Practical bayesian optimization of machine learning algorithms". In Advances in neural information processing systems, 2012, pp. 2951-2959.
Srinivas et al., "Gaussian process optimization in the bandit setting: No regret and experimental design", arXiv:0912.3995, Jun. 9, 2010, pp. 1-17.
Vaswani et al., "Attention is all you need", In Advances in neural information processing systems, 31st Conference on Neural Information Processing Systems Long Beach, CA, USA, Dec. 6, 2017, pp. 5998-6008.
Wright et al., "Numerical optimization", Springer Science, 1999, pp. 1-651.
Xue et al., "Restructuring of Deep Neural Network Acoustic Models with Singular Value Decomposition", Microsoft Corporation, One Microsoft Way, Redmond, WA 98052, In Interspeech, 2013, pp. 2365-2369.
Yu et al., "Playing the lottery with rewards and multiple languages: lottery tickets in RL and NLP", arXiv:1906.02768, Feb. 25, 2020, pp. 1-12.
Zanette et al., "Robust Super-Level Set Estimation using Gaussian Processes", In Joint European Conference on Machine Learning and Knowledge Discovery in Databases, Springer, 2018, pp. 276-291.
Zhang et al., "Adam-ADMM: A unified, systematic framework of structured weight pruning for DNNs", arXiv:1807.11091, Nov. 21, 2018, pp. 1-13.
Zhu et al., "Trained ternary quantization", Published as a conference paper at ICLR 2017, arXiv:1612.01064, 2016, pp. 1-10.
Zhuang et al., "Discrimination-aware channel pruning for deep neural networks", 32nd Conference on Neural Information Processing Systems, 2018, pp. 883-894.
Bagherinazhad et al., "Lcnn: Lookup-based convolutional neural network", In Proceedings of the IEEE Conference on Computer Vision and Pattern Recognition, 2017, pp. 7120-7129.
Betretrò, "Bayesian methods in global optimization", Journal of Global Optimization, vol. 1, No. 1 1991, pp. 1-14.
Garnett et al., "Bayesian optimization for sensor set selection", In Proceedings of the 9th ACM/IEEE international conference on information processing in sensor networks, ACM 978-1-60558-988-6/10/04, 2010, pp. 209-219.
Ginsbourger et al., A multi-points criterion for deterministic parallel global optimization based on gaussian processes. 2008, pp. 1-31.
Krizhevsky et al., "Learning multiple layers of features from tiny images", Technical report, Citeseer, 2009, pp. 1-60.
Krizhevsky et al., "The cifar-10 dataset", online:http://www.cs.toronto.edu/kriz/cifar.html, 55, 2014, 6 pages.
Krizhevsky et al., "Imagenet classification with deep convolutional neural networks", In Advances in neural information processing systems, 2012, pp. 1097-1105.
Lavin et al., "Fast algorithms for convolutional neural networks", In Proceedings of the IEEE Conference on Computer Vision and Pattern Recognition, Nov. 10, 2015, pp. 4013-4021.
Matern, B., "Spatial Variation", Springer-Verlag New York 1986, 1 page.
Mathieu et al., "Fast training of convolutional networks through FFTs", arXiv:1312.5851, Mar. 6, 2014, pp. 1-9.
Mongeau et al., "Comparison of public-domain software for black box global optimization", Optimization Methods and Software, DOI: 10.1080/10556780008805783, vol. 13, No. 3, 2000, pp. 203-226.
Rastegari et al., "Xnor-net: Imagenet classification using binary convolutional neural networks", In European Conference on Computer Vision, Springer, 2016, pp. 525-542.
Stein, M. L. "Interpolation of spatial data: some theory for kriging", Springer Science & Business Media, 2012, 263 pages.
Torn et al., Global optimization, vol. 350. Springer, 1989.
Vasilache et al., "Fast convolutional nets with fbfft: A gpu performance evaluation", Published as a conference paper at ICLR, arXiv:1412.7580, Apr. 10, 2015, pp. 1-17.
Zhang et al., "Accelerating very deep convolutional networks for classification and detection", IEEE transactions on pattern analysis and machine intelligence, Nov. 18, 2015, pp. 1943-1955.

\* cited by examiner

BAYESIAN OPTIMIZATION OF SPARSITY RATIOS IN MODEL COMPRESSION

CROSS-REFERENCE TO RELATED APPLICATIONS

This application claims the benefit of the U.S. Provisional application titled "RESOURCE-EFFICIENT BAYESIAN MODEL COMPRESSION," filed on Aug. 26, 2019, and having Ser. No. 62/891,897. The subject matter of this application is hereby incorporated herein by reference in its entirety.

GOVERNMENT RIGHTS IN THIS INVENTION

This invention is subject to US Government rights pursuant to DARPA SDH Software Defined Hardware Symphony DARPA TIA #HR0011-18-3-0007. The U.S. government has certain rights in this invention.

BACKGROUND

Field of the Various Embodiments

Embodiments of the present disclosure relate generally to compression of machine learning models, and more specifically, to Bayesian optimization of sparsity ratios in model compression.

Description of the Related Art

Deep neural networks commonly have a large number of computation-heavy layers such as convolutional layers and/or fully-connected layers. Such neural networks are also frequently trained and deployed using full-precision arithmetic. As a result, executing DNNs can involve significant complexity, latency, and memory consumption.

A number of techniques can be employed to reduce the memory footprint and inference time of deep neural networks. For example, parameters and/or activations of a neural network can be quantized to reduce the bit width of the parameters (e.g., from 32-bit floating point to 8-bit floating point) and/or convert certain matrix multiplication operations for calculating the activations into logical operations. Further, a weight in the neural network can be pruned (i.e., removed) when the weight has an absolute value and/or an effect on the training error of the neural network that falls below a threshold.

Existing techniques for compressing neural networks require the explicit specification of a target sparsity ratio representing the proportion of parameters in a pruned model with zero values compared with the original model. Alternatively, the existing techniques perform manual exploration of the search space for pruning or compressing a neural network. This manual exploration and/or selection of the amount of compression is computationally intensive and inconvenient, as the optimal sparsity ratio depends on the neural network, target platform, and optimization objective, and each trial in the exploration requires retraining the compressed model to convergence.

As the foregoing illustrates, what is needed in the art are more efficient techniques for determining optimal sparsity ratios for compressing machine learning models.

SUMMARY

One embodiment of the present invention sets forth a technique for compressing a machine learning model. The technique includes determining, by a Bayesian optimizer, a first sparsity ratio associated with a limit on an accuracy loss caused by compressing the machine learning model. The technique further includes selecting, by the Bayesian optimizer, a second sparsity ratio that optimizes a predefined objective function for the machine learning model within a search space bounded by the first sparsity ratio. The technique further includes generating a compressed version of the machine learning model having the second sparsity ratio.

One technological advantage of the disclosed techniques is the ability to infer a sparsity ratio that meets constraints and/or objectives associated with compressing the machine learning model instead of requiring a user to manually specify a sparsity ratio for compressing the machine learning model. Consequently, the disclosed techniques provide technological improvements in computer systems, applications, and/or techniques for compressing and/or executing machine learning models.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
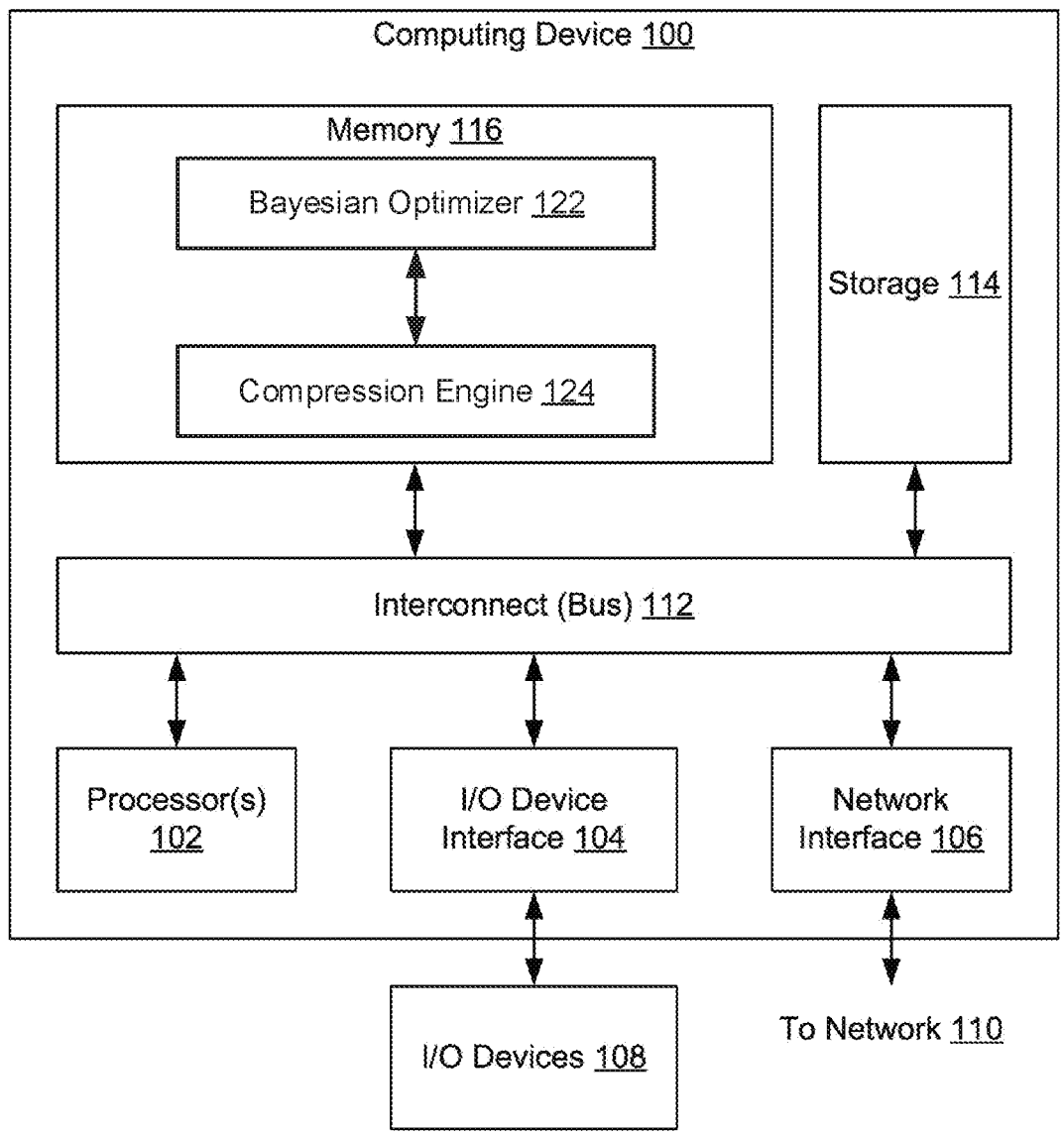
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a Bayesian optimizer 122 and compression engine 124 that reside in a memory 116. It is noted that the computing device described herein is illustrative and that any other technically feasible configurations fall within the scope of the present disclosure. For example, multiple instances of Bayesian optimizer 122 and compression engine 124 may execute on a set of nodes in a distributed system to implement the functionality of computing device 100.

In one embodiment, computing device 100 includes, without limitation, an interconnect (bus) 112 that connects one or more processing units 102, an input/output (I/O) device interface 104 coupled to one or more input/output (I/O) devices 108, memory 116, a storage 114, and a network interface 106. Processing unit(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Bayesian optimizer 122 and compression engine 124 may be stored in storage 114 and loaded into memory 116 when executed.

In one embodiment, memory 116 includes a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including Bayesian optimizer 122 and compression engine 124.

In some embodiments, Bayesian optimizer 122 and compression engine 124 include functionality to improve the runtime performance of a machine learning model by compressing the machine learning model. For example, the machine learning model includes a deep neural network (DNN) with a large number of neurons, parameters, and/or layers. As a result, inference by the DNN requires significant consumption of computational and memory resources. To improve the inference time, memory footprint, and/or other runtime attributes of the machine learning model, Bayesian optimizer 122 and/or compression engine 124 create a compressed version of the machine learning model by selectively pruning a subset of weights in the DNN and/or quantizing the weights. In turn, the compressed version incurs significantly less resource overhead and latency than the uncompressed model without appreciable loss of accuracy.

More specifically, Bayesian optimizer 122 and compression engine 124 include functionality to optimize the compression of a machine learning model according to predefined and/or tunable objectives and/or constraints. Continuing with the above example, Bayesian optimizer 122 receives, from a user, an objective to be optimized in compressing the machine learning model, a lower limit on the loss of accuracy associated with compressing the machine learning model, and/or a compression scheme. Bayesian optimizer 122 and compression engine 124 then iteratively sample different sparsity ratios for compressing the machine learning model using the compression scheme. Finally, Bayesian optimizer 122 and compression engine 124 produce a compressed version of the machine learning model having a sparsity ratio that best optimizes the objective while meeting the constraint represented by the limit on the accuracy loss. Various embodiments of Bayesian optimizer 122 and compression engine 124 are described in further detail below with respect to FIG. 2.

Bayesian Optimization of Sparsity Ratios in Model Compression

Figure 2:
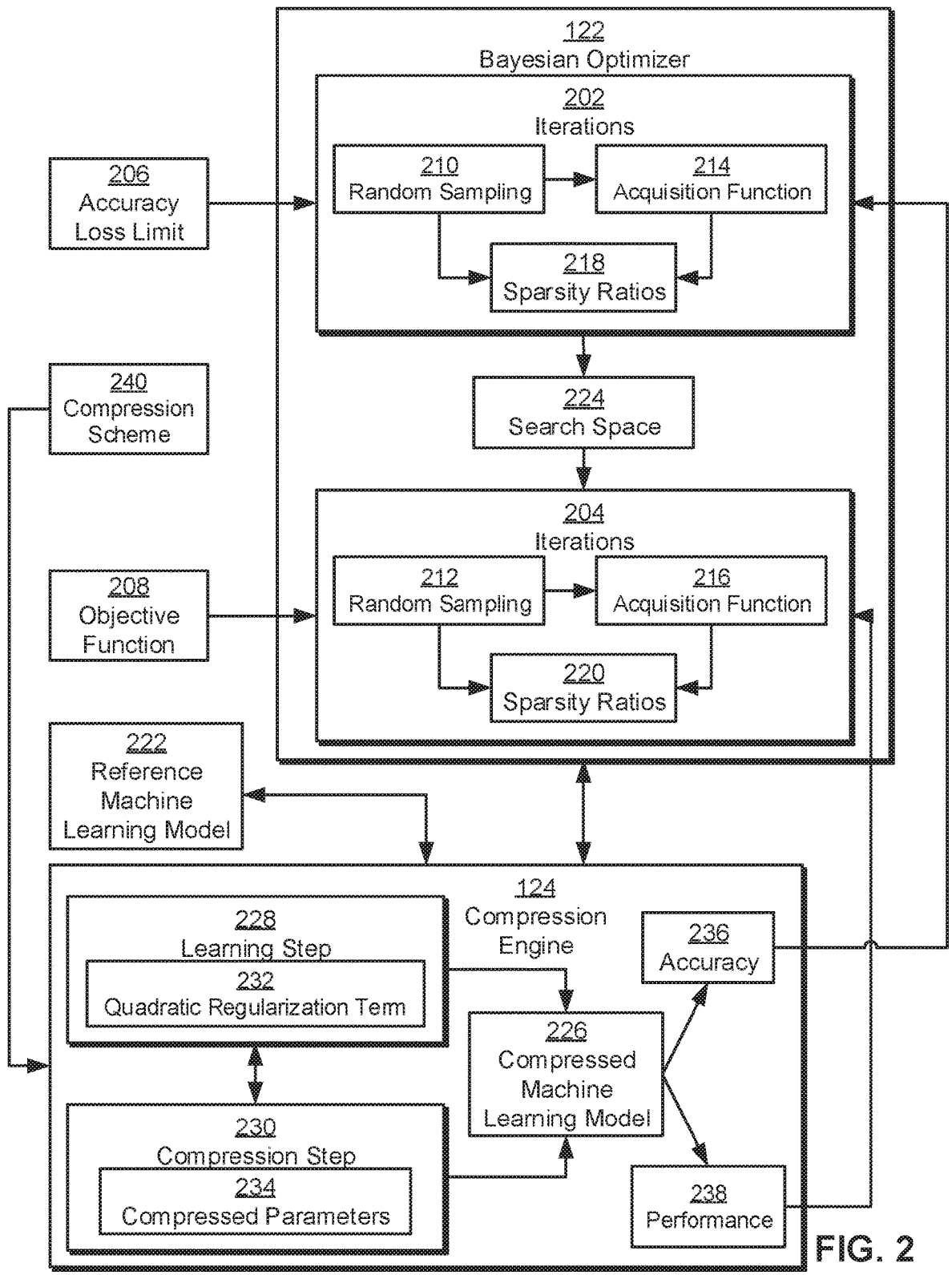
FIG. 2 is a more detailed illustration of the Bayesian optimizer and compression engine of FIG. 1, according to one or more aspects of various embodiments.

FIG. 2 is a more detailed illustration of Bayesian optimizer 122 and compression engine 124 of FIG. 1, according to various embodiments. In the embodiment shown, Bayesian optimizer 122 samples sparsity ratios 218-220 for generating a compressed machine learning model 226 from a reference machine learning model 222 (e.g., an uncompressed machine learning model and/or a compressed machine learning model that is to be compressed further) based on a predefined accuracy loss limit 206, objective function 208, and compression scheme 240. For example, Bayesian optimizer 122 receives accuracy loss limit 206, objective function 208, and/or compression scheme 240 from a user via function calls, command line parameters, a graphical user interface (GUI), and/or another type of interface or communication mechanism.

In some embodiments, a sparsity ratio (e.g., sparsity ratios 218-220) represents the proportion of parameters that have been pruned (e.g., replaced with zero values) in compressed machine learning model 226 compared with the original reference machine learning model 222. The sparsity ratio also, or instead, reflects a ratio of the size of compressed machine learning model 226 to the size of the original reference machine learning model 222. For example, the sparsity ratio may be obtained by subtracting the density ratio of compressed machine learning model 226 from 1, where the density ratio equals the size of compressed machine learning model 226 divided by the size of reference machine learning model 222. In general, the sparsity ratio indicates the reduction in size of compressed machine learning model 226 when compared with the original, reference machine learning model 222.

Accuracy loss limit 206 represents a lower bound on the reduction in accuracy caused by generating compressed machine learning model 226 from reference machine learning model 222. For example, accuracy loss limit 206 is expressed by the user as a percentage or proportion of the accuracy of reference machine learning model 222.

In some embodiments, objective function 208 includes a black-box function to be maximized or minimized. For example, a user specifies objective function 208 as an inference throughput (e.g., a rate at which compressed machine learning model 226 performs evaluation), memory footprint, latency (e.g., the amount of time required by compressed machine learning model 226 to perform evaluation), a domain-specific objective (e.g., "smoothness" or frame rate of video output), and/or another value that can be measured or calculated from the execution or output of compressed machine learning model 226. The user additionally specifies minimization or maximization of objective function 208 as an objective associated with compressed machine learning model 226.

Compression scheme 240 includes a type of compression to be applied to produce compressed machine learning model 226. For example, a user selects compression scheme 240 from a list that includes, but is not limited to, quantization of parameters (e.g., from 32-bit floating point to 16-bit floating point), unstructured magnitude-based pruning of weights in a DNN, pruning of neurons in the DNN, pruning of blocks of various dimensions in the DNN, and/or low-rank tensor factorization. In another example, the user programmatically expresses compression scheme 240 as the composition of multiple compression schemes with control flow, iteration, recursion, and/or other imperative statements. These statements allow for selective compression of layers and/or other portions of reference machine learning model 222 based on properties of reference machine learning model 222 and/or the target hardware on which compressed machine learning model 226 is to be deployed.

In one or more embodiments, Bayesian optimizer 122 and compression engine 124 perform a number of iterations 202-204 that sample different sparsity ratios 218 for producing compressed machine learning model 226 from reference machine learning model 222 using compression scheme 240. During each iteration, Bayesian optimizer 122 selects a sparsity ratio for compressed machine learning model 226, and compression engine 124 uses compression scheme 240 to produce compressed machine learning model 226 from reference machine learning model 222 in a way that adheres to the selected sparsity ratio. Compression engine 124 also measures an accuracy 236, performance 238, and/or another value related to the execution or output of compressed machine learning model 226 and provides the measurement to Bayesian optimizer 122. Bayesian optimizer uses measurements from compression engine 124 to update a probabilistic belief about the output as a function of sparsity ratio in compressed machine learning model 226 and uses an acquisition function to select the next sparsity ratio to sample in the next iteration. At the end of iterations 202-204, Bayesian optimizer 122 and compression engine 124 produce compressed machine learning model 226 having a sparsity ratio that optimizes objective function 208 while conforming to the constraint represented by accuracy loss limit 206.

During each iteration performed by Bayesian optimizer 122, compression engine 124 generates compressed machine learning model 226 having the sparsity ratio selected by Bayesian optimizer 122 for that iteration. As shown, such compression involves a learning step 228 that trains reference machine learning model 222 with a quadratic regularization term 232 and a compression step 230 that converts the trained reference machine learning model 222 from learning step 228 into compressed machine learning model 226 version with compressed parameters 234.

For example, compression of reference machine learning model 222 by compression engine 124 is formulated as a constrained optimization problem with the following representation:

$$\min_{w,\theta} L(w) \, s.t. \, w = D(\theta)$$

In the above representation, $L()$ denotes a loss function used to train reference machine learning model 222, and $w \in R^P$ represents uncompressed parameters of reference machine learning model 222 (e.g., neural network weights). A decompression mapping $D: \theta \in R^P \to w \in R^n$ maps compressed parameters 234 $\theta$ of compressed machine learning model 226 to the uncompressed parameters.

The above formulation supports a number of compression schemes. For example, pruning is defined as $w = D(\theta) = \theta$, where $w$ is real and $\theta$ is constrained to have fewer nonzero values by removing (zeroing out) lower magnitude weights. In another example, low-precision approximation (i.e., quantization) defines a per-parameter constraint $w_i = \theta_i$, where $w_i$ is a higher-precision representation of a weight in reference machine learning model 222 and $\theta_i$ is a lower-precision representation of the same weight in compressed machine learning model 226.

A compression mapping behaves similarly to the inverse of D:

$$\prod_C^{\leq} (w; \kappa) = \mathrm{argmin}_\theta \|w - \theta\|^2 \text{ s.t. } C(\theta) \leq \kappa$$

In the above expression, $C: R^n \to R^+$ represents a cost function that promotes sparsity in compressed parameters 234, where $C(0) = 0$ and $C(w) > 0$ if $w = 0$. $\kappa$ represents a constraint on the number or complexity of compressed parameters 234, and the "≤" superindex refers to the constraint form of the compression mapping.

In turn, the constrained optimization problem can be expressed using the following alternative representation:

$$\min_{w,\theta} L(w) \, s.t. \, C(\theta) \leq \kappa, w = \theta$$

The constrained optimization problem can then be optimized via quadratic regularization term 232 and/or an augmented-Lagrangian (AL) method:

$$Q(w, \theta, \mu) = L(w) + \frac{\mu}{2} \|w - \theta\|^2 \text{ s.t. } C(\theta) \leq \kappa$$

$$L_A(w, \theta, \lambda; \mu) = L(w) + \frac{\mu}{2} \|w - \theta\|^2 - \lambda^T(w - \theta) \text{ s.t. } C(\theta) \leq \kappa$$

The first equation uses a value of $$\frac{\mu}{2} \|w - \theta\|^2$$

for quadratic regularization term 232 to optimize Q over $(w, \theta)$ while driving $\mu \to \infty$, so that the equality constraints are satisfied in the limit. The second equation uses the AL method to alternate optimizing $L_A$ over $(w, \theta)$ with updating $\lambda \leftarrow \lambda - \mu(w - \theta)$ while driving $\mu \to \infty$.

To optimize the above equations over the variables $(w, \theta)$, compression engine 124 applies alternating optimization using learning step 228 and compression step 230. During learning step 228, compression engine 124 performs the following optimization using the following equation:

$$\min_w L(w) + \frac{\mu}{2}\|w - \theta\|^2$$

The second term in the above equation represents quadratic regularization term 232, which is used in training of reference machine learning model 226 to pull some parameters to zero and other parameters to a nonzero value.

If the AL method is used in the optimization, compression engine 124 performs learning step 228 using the following equation:

$$\min_w L(w) + \frac{\mu}{2}\left\|w - \theta + \frac{1}{\mu}\lambda\right\|^2$$

During compression step 230, the compression mapping above can be solved for various costs C, such as (but not limited to) $l_0$, $l_1$, and $l_2^2$. Each of these costs can be solved by projecting on $l_p$ balls. When w is in the ball, $\theta = w$. Otherwise, $l_0$ leaves the top-$\kappa$ weights unchanged and prunes the rest, $l_1$ shrinks on average the top-k weights (where k depends on w and $\kappa$) and prunes the rest, and $l_2^2$ shrinks all weights by normalizing w.

Moreover, compression step 230 "marks" parameters to be compressed by setting the $\theta_1$ values. A subsequent learning step 228 then updates the $w_i$ values according to the loss function and the marked $\theta_1$ values. As compression engine 124 iteratively alternates between learning step 228 and compression step 230, different sets of marked weights are explored until a set of marked weights is found for which $w_i \to 0$ as $\mu \to \infty$, which results in pruning of those weights. Consequently, compression engine 124 produces compressed machine learning model 226 with a given sparsity ratio and a locally optimal loss of accuracy from reference machine learning model 222.

In some embodiments, Bayesian optimizer 122 performs a first set of iterations 202 that sample sparsity ratios 218 for producing compressed machine learning model 226 to identify a highest sparsity ratio that falls within accuracy loss limit 206. Bayesian optimizer 122 then sets the identified sparsity ratio as a boundary of a search space 224 for a second set of iterations 204. During the second set of iterations 202, Bayesian optimizer 122 samples additional sparsity ratios 220 for producing compressed machine learning model 226 within search space 244 to identify a sparsity ratio that produces the best performance 238 in optimizing objective function 208.

In one embodiment, Bayesian optimizer 122 utilizes a Gaussian Process (GP) prior distribution for a given black box function $f(x)$, which can include accuracy 236 and/or objective function 208. The GP includes a distribution over functions that is specified by a mean function $m: X \to R$ and a covariance function $K: X \times X \to R$. As Bayesian optimizer 122 and compression engine 124 accumulate observations $D_{1:t} = \{x_{1:t}, y_{1:t}\}$, Bayesian optimizer 122 combines the prior distribution $P(f)$ with the likelihood function $P(D_{1:t}|f)$ to produce the posterior distribution $P(f|D_{1:t}) \propto P(D_{1:t}|f)P(f)$.

During each iteration in iterations 202, compression engine 124 produces compressed machine learning model 226 at a sparsity ratio (e.g., sparsity ratios 218) sampled by Bayesian optimizer 122 for that iteration. Compression engine 124 also determines accuracy 236 of compressed machine learning model 226, and Bayesian optimizer 122 updates the GP prior with the calculated accuracy 236 before optimizing an acquisition function over the GP prior to determine the next sparsity ratio to sample in a successive iteration.

At the end of iterations 202, Bayesian optimizer 122 sets the boundaries of search space 224 for iterations 204 to range from a sparsity ratio of 0 to the sparsity ratio identified by iterations 202 as having substantially the same accuracy 236 as accuracy loss limit 206. During each iteration in iterations 204, compression engine 124 produces compressed machine learning model 226 at a sparsity ratio (e.g., sparsity ratios 220) sampled by Bayesian optimizer 122 for that iteration. Compression engine 124 also determines performance 238 of compressed machine learning model 226 as the value of objective function 208 for compressed machine learning model 226, and Bayesian optimizer 122 updates the GP prior with performance 238 before optimizing an acquisition function over the GP prior to determine the next sparsity ratio to sample in a subsequent iteration.

Bayesian optimizer also uses sampling criteria represented by one or more acquisition functions 214-216 $a: X \to R$ to guide the selection of the next sparsity ratio to sample. These acquisition functions 214-216 depend on the previous observations $\{x_n, y_n\}$ and the GP hyperparameters $\rho$. Under the GP prior, each acquisition function 214 or 216 depends on a predictive mean function $\mu(x; \{x_n, y_n\}, \rho)$ and predictive variance function $\sigma^2(x; \{x_n, y_n\}, \Sigma)$.

Bayesian optimizer 122 additionally selects sparsity ratios 218-220 using a combination of random sampling 210-212 and sampling criteria based on acquisition functions 214-216 for each set of iterations 202-204. For example, Bayesian optimizer 122 starts iterations 202 with one or more rounds of random sampling 210 of sparsity ratios 218. Bayesian optimizer 122 obtains values of accuracy 236 returned by compression engine 124 for the randomly sampled sparsity ratios 218 and updates the GP prior for accuracy 236 using the values. Bayesian optimizer 122 then performs additional iterations 202 that sample sparsity ratios 218 according to acquisition function 214 associated with the GP prior for accuracy 236.

Continuing with the above example, Bayesian optimizer 122 similarly starts iterations 204 with one or more rounds of random sampling 212 of sparsity ratios 220. Bayesian optimizer 122 obtains values of performance 238 returned by compression engine 124 for the randomly sampled sparsity ratios 220 and updates the GP prior for objective function 208 using the values. Bayesian optimizer 122 then performs additional iterations 204 that sample sparsity ratios 220 according to acquisition function 216 associated with the GP prior for objective function 208.

The operation of Bayesian optimizer 122 is illustrated using the following example pseudocode:

```
Input: w, ε
Output: s*
AcqFn ← ILS-UCB(L = w_acc − ε, s = (0, 1))
S_acc ← BayesOpt(B_f = L-C, AcqFn)
AcqFn ← GP-UCB(s = (0, s_acc))
s* ← BayesOpt(B_f = f, AcqFn)
BayesOpt
Input: B_f, AcqFn
Output: s
GP ← GP-Regressor.initialize( )
for t ← 0, 1, 2, ... do
```

```
s_t ← argmax_s AcqFn(s | D_{1:t−1})
y_t ← f(s_t)
D_{1:t} ← {D_{1:t−1}, (s_t, y_t)}
GP.Update(D_{1:t})
if t > 0 and s_t == s_{t−1} then
    return s_t
end if
end for
```

In the above pseudocode, input to Bayesian optimizer 122 includes a reference machine learning model 222 w and accuracy loss limit 206 ε. The output of Bayesian optimizer 122 s* represents a sparsity ratio for compressed machine learning model 226 with the best performance 238 in optimizing objective function 208 and a value of accuracy 236 that falls within accuracy loss limit 206.

More specifically, the above pseudocode uses an implicit level set upper confidence bound (ILS-UCB) acquisition function 214 for iterations 202, where the level set L is defined by subtracting ε from the accuracy of reference machine learning model 222. In turn, iterations 202 prioritize sampling of sparsity ratios 218 near the level set to localize the sparsity that meets accuracy loss limit 206, which reduces the total number of measurements and time required to achieve an optimal sparsity ratio $s_{acc}$ for accuracy loss limit 206.

For example, the ILS-UCB acquisition function 214 used to select sparsity ratios 218 during iterations 202 includes the following representation:

$$x_t = \underset{x \in \mathcal{X}}{\mathrm{argmax}}(1 - \gamma)\sigma(x) - \gamma|\mu(x) - L|$$

In the above representation, γ represents a tuning parameter between 0 and 1 that balances the contribution of the predictive mean of acquisition function 214 with the contribution of the predictive variance of the acquisition function to the sample in iteration t.

Next, the pseudocode uses a search space constrained by (0, $s_{acc}$) and an acquisition function of GP-UCB as acquisition function 216 for iterations 204. The pseudocode then executes iterations 204 to sample sparsity ratios 220 in a way that maximizes objective function 208. Alternatively, an different acquisition function 216 of GP lower confidence bound (GP-LCB) can be used to sample sparsity ratios 220 in a way that minimizes objective function 208. When acquisition function 216 selects the same sparsity ratio in two consecutive iterations 204, iterations 204 are discontinued, and the selected sparsity ratio is returned as the optimal sparsity ratio s*.

Figure 3:
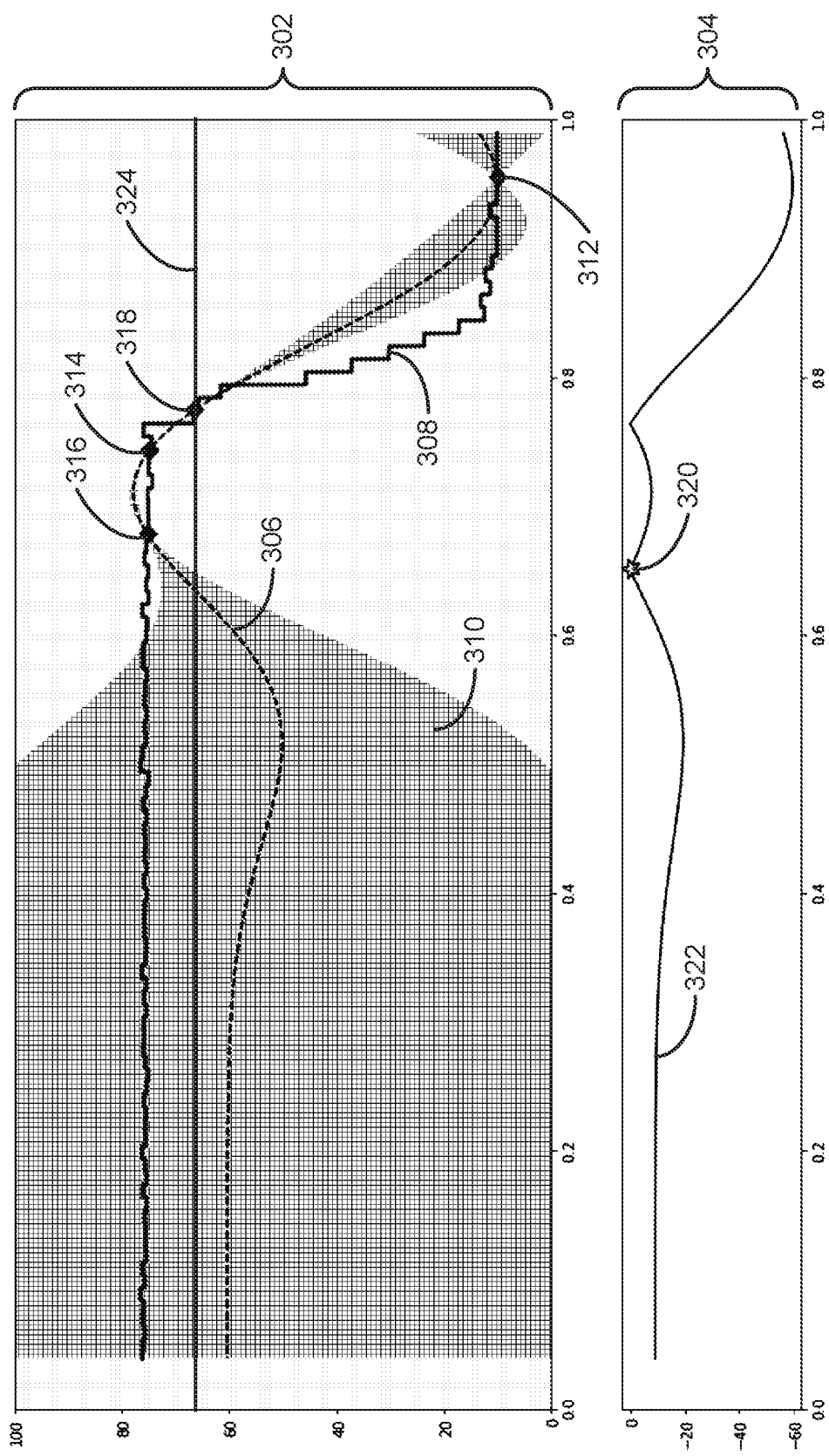
FIG. 3 is an example set of plots of iterations performed by the Bayesian optimizer of FIG. 2, according to one or more aspects of various embodiments.

FIG. 3 is an example set of plots 302-304 of iterations performed by Bayesian optimizer 122 of FIG. 2, according to one or more aspects of various embodiments. More specifically, plot 302 shows a prediction 306 by Bayesian optimizer 122 of a black box function that varies with the sparsity ratio of compressed machine learning model 226, and plot 304 shows an acquisition function 322 used by Bayesian optimizer 122 to select a next sample 320 of the black box function to evaluate.

Within plot 302, prediction 306 represents the posterior predictive mean of a GP prior that is conditioned on previous samples 312-318 of the black box function. Plot 302 also includes a shaded region 310 surrounding prediction 306 that represents the 95% confidence interval of the mean. Plot 302 additionally shows target 308 values of the black box function to be predicted by Bayesian optimizer 122 via samples 312-318.

In one embodiment, samples 312-318 include four observations of accuracy 236 of compressed machine learning model 226 at various sparsity ratios 218 sampled by Bayesian optimizer 122 over four iterations 202. For example, samples 312-314 represent two randomly sampled sparsity ratios that are used to "seed" the GP prior, and samples 316-318 represent sparsity ratios that are selected by Bayesian optimizer 122 based on acquisition function 322. After the black box function is evaluated for samples 316-318, Bayesian optimizer 122 updates the GP prior to produce an updated prediction 306 that better approximates the black box function. Bayesian optimizer 122 then uses the updated prediction 306 to construct or update an ILS-UCB acquisition function 322 and selects the next sample 320 for a successive iteration as the maximum of acquisition function 322.

For example, Bayesian optimizer 122 uses ILS-UCB to prioritize sampling in areas near a level set where the mean of the GP prior is closest to a threshold 324 representing accuracy loss limit 206 for compressed machine learning model 226. After a number of iterations 202, Bayesian optimizer 122 identifies sample 318 as having a sparsity ratio that produces a compressed machine learning model 226 with accuracy 236 that is equal to accuracy loss limit 206. In turn, Bayesian optimizer 122 performs additional iterations 204 that sample sparsity ratios 220 within search space 224 that is bounded by the sparsity ratio of sample 318 to select another sparsity ratio for producing compressed machine learning model 226 that optimizes a user-specified objective function 208 while meeting accuracy loss limit 206.

Figure 4:
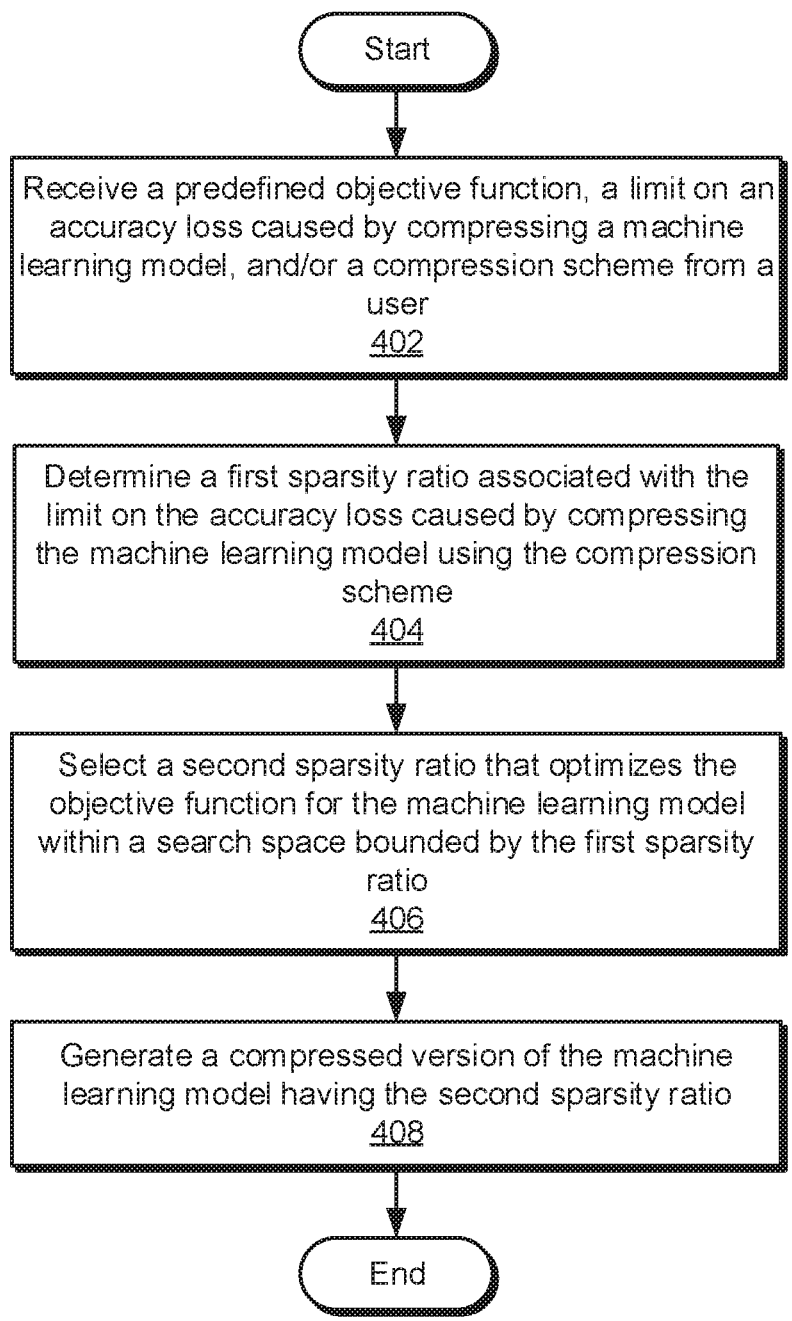
FIG. 4 is a flow diagram of method steps for selecting a sparsity ratio for compressing a machine learning model, according to one or more aspects of various embodiments.

FIG. 4 is a flow diagram of method steps for compressing a machine learning model, according to one or more aspects of various embodiments. Although the method steps are described in conjunction with the systems of FIGS. 1 and 2, persons skilled in the art will understand that any system configured to perform the method steps in any order falls within the scope of the present disclosure.

As shown, Bayesian optimizer 122 receives 402 a predefined objective function, a limit on an accuracy loss caused by compressing the machine learning model, and/or a compression scheme from a user. For example, the objective function includes an evaluation rate for the machine learning model, memory footprint, evaluation time for the machine learning model, domain-specific objective (e.g., "smoothness" or frame rate of video output), and/or another value that can be measured or calculated from the execution or output of the machine learning model. The user additionally specifies minimization or maximization of the objective function as an objective associated with compressing the machine learning model. In another example, the user specifies the limit on the accuracy loss as a percentage or proportion of the accuracy of the uncompressed machine learning model. In a third example, the user specifies the compression scheme as quantization, unstructured magnitude-based pruning of weights in a DNN, pruning of neurons in the DNN, pruning of blocks of various dimensions in the DNN, and/or low-rank tensor factorization.

Next, Bayesian optimizer 122 determines 404 a first sparsity ratio associated with the limit on the accuracy loss caused by compressing the machine learning model using the compression scheme 404. For example, Bayesian optimizer 122 performs a first series of iterations that use an ILS-UCB sampling criterion to sample sparsity ratios for compressing the machine learning model. At the end of the first series of iterations, Bayesian optimizer 122 identifies the first sparsity ratio as the amount of compression (e.g., zero-valued parameters, quantization of parameters, etc.) in the machine learning model that produces an accuracy corresponding to the limit on the accuracy loss.

Bayesian optimizer 122 then selects 406 a second sparsity ratio that optimizes the objective function for the machine learning model within a search space bounded by the first sparsity ratio. For example, Bayesian optimizer performs a second series of iterations that use a GP-UCB (or GP-LCB) sampling criterion to sample sparsity ratios that maximize (or minimize) the objective function, where the sampled sparsity ratios range from 0 to the first sparsity ratio. At the end of the second series of iterations, Bayesian optimizer 122 identifies the second sparsity ratio as the amount of compression in the machine learning model that best optimizes the objective function within exceeding the accuracy loss limit.

During each iteration performed by Bayesian optimizer 122 to select the first and second sparsity ratios, compression engine 124 generates a different compressed version of the machine learning model, where each compressed version has a sparsity ratio selected by Bayesian optimizer 122 for that iteration. Compression engine 124 also determines the accuracy and/or value of the objective function for the sparsity ratio, and Bayesian optimizer 122 updates a GP prior for the accuracy and/or objective function based on the accuracy and/or value of the objective function. The operation of compression engine 124 is described in further detail below with respect to FIG. 5.

Finally, Bayesian optimizer 122 and/or compression engine 124 generate 408 a compressed version of the machine learning model having the second sparsity ratio. For example, Bayesian optimizer 122 samples the second sparsity ratio by optimizing an acquisition function over the GP prior for the objective function. Compression engine 124 then compresses the machine learning model to have the second sparsity ratio and verifies that the compressed machine learning model produces a better value of the objective function than previous compressed versions of the machine learning model.

Figure 5:
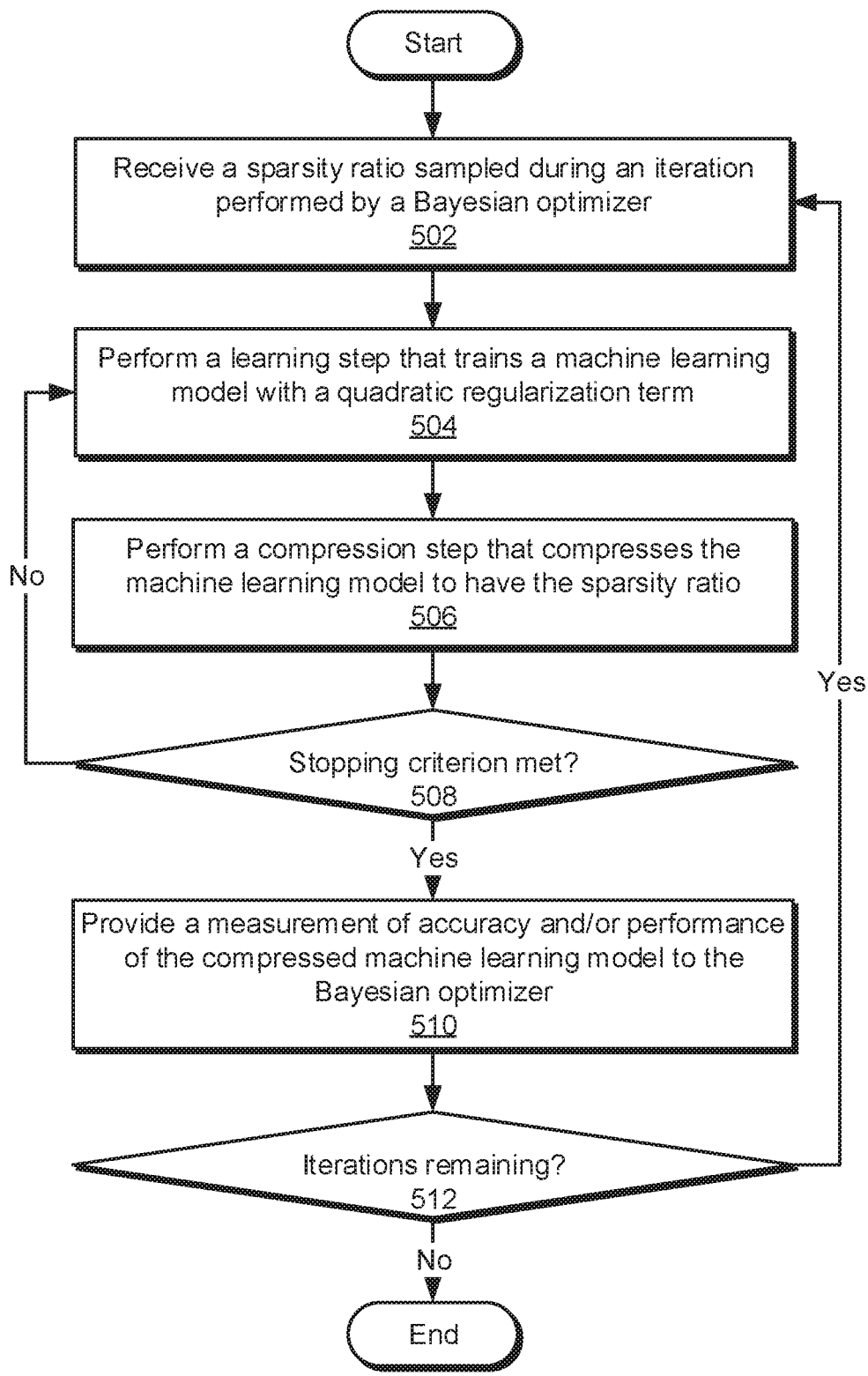
FIG. 5 is a flow diagram of method steps for compressing a machine learning model, according to one or more aspects of various embodiments.

FIG. 5 is a flow diagram of method steps for compressing a machine learning model, according to one or more aspects of various embodiments. Although the method steps are described in conjunction with the systems of FIGS. 1 and 2, persons skilled in the art will understand that any system configured to perform the method steps in any order falls within the scope of the present disclosure.

As shown, compression engine 124 receives 502 a sparsity ratio sampled during an iteration performed by Bayesian optimizer 122. For example, the sparsity ratio includes a randomly sampled sparsity ratio that is used to "seed" the GP prior for a black box function to be optimized and/or a sparsity ratio that is selected by Bayesian optimizer 122 based on sampling criteria and/or an acquisition function associated with the GP prior.

Next, compression engine 124 performs 504 a learning step that trains the machine learning model with a quadratic regularization term. For example, compression engine 124 updates parameters of the machine learning model using a loss function that includes the quadratic regularization term. In turn, the quadratic regularization term imposes a penalty that pulls some parameters to zero based on squares calculated from the values of the parameters.

After the learning step is complete, compression engine 124 performs 506 a compression step that compresses the machine learning model to have the sparsity ratio provided by the Bayesian optimizer. For example, compression engine 124 marks a subset of parameters in the machine learning model to be compressed.

Compression engine 124 additionally repeats operations 504-506 until a stopping criterion is met 508. For example, the stopping criterion includes convergence in the parameters of the compressed machine learning model. As a result, compression engine 124 iteratively alternates between the learning step and compression step, which allows different sets of marked parameters to be explored until the trained parameters produced by the learning step equal the marked parameters in the compression step. In another example, compression engine 124 repeats operations 504-506 until a fixed number of learning and compression steps have been performed.

Compression engine 124 then provides 510 a measurement of accuracy and/or performance of the compressed machine learning model to Bayesian optimizer 122. For example, compression engine 124 determines the accuracy of the compressed machine learning model during a first series of iterations performed by the Bayesian optimizer to find a first sparsity ratio that reflects an accuracy loss limit for the compressed machine learning model. Compression engine 124 also, or instead, determines the performance of the compressed machine learning model in optimizing a predefined objective function during a second series of iterations performed by Bayesian optimizer 122 to find a second sparsity ratio that produces the best value of the objective function.

Operations 502-510 may be repeated for remaining iterations 512 performed by Bayesian optimizer 122. For example, compression engine 124 receives a new sparsity ratio at the beginning of each iteration performed by Bayesian optimizer 122, creates a compressed machine learning model having the sparsity ratio, and provides the accuracy and/or performance of the compressed machine learning model to Bayesian optimizer 122. Bayesian optimizer 122 then uses the measured accuracy and/or performance to update a GP prior for the accuracy and/or performance and uses an acquisition function and/or selection criteria for the GP prior to select the next sparsity ratio to sample in a successive iteration. As a result, compression engine 124 repeatedly generates compressed versions of the machine learning model and determines the accuracy and/or performance of each compressed version until a compressed version with the best performance that still maintains an acceptable level of accuracy is found.

In sum, the disclosed embodiments perform sample-efficient Bayesian optimization of sparsity ratios in compressing a machine learning model. A first series of Bayesian optimization iterations is performed to identify a first sparsity ratio that represents a lower limit on the loss in accuracy from compressing the machine learning model. A second series of Bayesian optimization iterations is then performed to identify a second sparsity ratio that produces the best value of a predefined objective function within a search space bounded by the first sparsity ratio. The machine learning model is then compressed to have the second sparsity ratio, which allows the compressed machine learning model to optimize the objective function while maintaining an accuracy that is higher than the lower limit on the accuracy loss.

One technological advantage of the disclosed techniques is the ability to infer a sparsity ratio that meets constraints and/or objectives associated with compressing the machine learning model instead of requiring a user to manually specify a sparsity ratio for compressing the machine learning model. In turn, the compressed machine learning model incurs significantly less inference time and resource overhead than the uncompressed machine learning model without appreciable loss of accuracy. Another technological advantage includes sample-efficient selection of the sparsity ratio via Bayesian optimization, which significantly reduces the number of iterations (and associated latency and resource consumption) required to identify the optimal sparsity ratio for compressing the machine learning model over conventional techniques that involve manual and/or random searching of sparsity ratios for compressing machine learning models. Consequently, the disclosed techniques provide technological improvements in computer systems, applications, and/or techniques for compressing and/or executing machine learning models.

1. In some embodiments, a computer-implemented method for compressing a machine learning model comprises determining, by a Bayesian optimizer, a first sparsity ratio associated with a limit on an accuracy loss caused by compressing the machine learning model; selecting, by the Bayesian optimizer, a second sparsity ratio that optimizes a predefined objective function for the machine learning model within a search space bounded by the first sparsity ratio; and generating a compressed version of the machine learning model having the second sparsity ratio.

2. The computer-implemented method of clause 1, further comprising generating a different compressed version of the machine learning model for each iteration performed by the Bayesian optimizer to select the first and second sparsity ratios.

3. The computer-implemented method of any of clauses 1-2, wherein generating the different compressed version of the machine learning model comprises performing a learning step that trains the machine learning model with a quadratic regularization term; and performing a compression step that compresses the machine learning model to have a specified sparsity ratio at a given iteration of the Bayesian optimizer.

4. The computer-implemented method of any of clauses 1-3, wherein the learning step and the compression step are repeated until a stopping criterion is met.

5. The computer-implemented method of any of clauses 1-4, wherein the Bayesian optimizer performs one or more iterations that randomly sample the first and second sparsity ratios for the machine learning model.

6. The computer-implemented method of any of clauses 1-5, wherein the Bayesian optimizer performs one or more iterations that select the first sparsity ratio based on an implicit level set upper confidence bound (ILS-UCB) sampling criterion.

7. The computer-implemented method of any of clauses 1-6, wherein the Bayesian optimizer performs one or more iterations that select the second sparsity ratio based on a confidence bound sampling criterion.

8. The computer-implemented method of any of clauses 1-7, further comprising receiving the predefined objective function from a user.

9. The computer-implemented method of any of clauses 1-8, wherein the predefined objective function comprises at least one of an evaluation rate for the machine learning model, a memory footprint, an evaluation time for the machine learning model, and a domain-specific objective.

10. The computer-implemented method of any of clauses 1-9, wherein the Bayesian optimizer selects the second sparsity ratio based on a Gaussian process prior for the predefined objective function.

11. The computer-implemented method of any of clauses 1-10, wherein generating the compressed version of the machine learning model comprises at least one of quantizing weights of the machine learning model and pruning a subset of the weights from the machine learning model.

12. In some embodiments, a non-transitory computer readable medium stores instructions that, when executed by a processor, cause the processor to compress a machine learning model by performing the steps of determining, by a Bayesian optimizer, a first sparsity ratio associated with a limit on an accuracy loss caused by compressing the machine learning model; selecting, by the Bayesian optimizer, a second sparsity ratio that optimizes a predefined objective function for the machine learning model within a search space bounded by the first sparsity ratio; and generating a compressed version of the machine learning model having the second sparsity ratio.

13. The non-transitory computer readable medium of clause 12, wherein the steps further comprise generating a different compressed version of the machine learning model for each iteration performed by the Bayesian optimizer to select the first and second sparsity ratios.

14. The non-transitory computer readable medium of any of clauses 12-13, wherein generating the different compressed version of the machine learning model comprises performing a learning step that trains the machine learning model with a quadratic regularization term; and performing a compression step that compresses the machine learning model to have a specified sparsity ratio at a given iteration of the Bayesian optimizer.

15. The non-transitory computer readable medium of any of clauses 12-14, wherein the Bayesian optimizer performs one or more iterations that randomly sample the first and second sparsity ratios for the machine learning model.

16. The non-transitory computer readable medium of any of clauses 12-15, wherein Bayesian optimizer performs a first series of iterations that select the first sparsity ratio based on an implicit level set upper confidence bound (ILS-UCB) sampling criterion and a second series of iterations that select the second sparsity ratio based on a confidence bound sampling criterion.

17. The non-transitory computer readable medium of any of clauses 12-16, wherein the steps further comprise receiving the predefined objective function and the limit on the accuracy loss from a user.

18. The non-transitory computer readable medium of any of clauses 12-17, wherein the predefined objective function comprises at least one of an inference throughput, a memory footprint, a latency, and a domain-specific objective.

19. The non-transitory computer readable medium of any of clauses 12-18, wherein generating the compressed version of the machine learning model comprises at least one of quantizing weights of the machine learning model and pruning a subset of the weights from the machine learning model.

20. In some embodiments, a system comprises a memory storing instructions; and a processor for executing the instructions to determine, by a Bayesian optimizer, a first sparsity ratio associated with a limit on an accuracy loss caused by compressing the machine learning model; select, by the Bayesian optimizer, a second sparsity ratio that optimizes a predefined objective function for the machine learning model within a search space bounded by the first sparsity ratio; and generate a compressed version of the machine learning model having the second sparsity ratio.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for compressing a machine learning model, comprising:
   determining, by a Bayesian optimizer, a first sparsity ratio associated with a limit on an accuracy loss caused by compressing the machine learning model;
   selecting, by the Bayesian optimizer, a second sparsity ratio that optimizes a predefined objective function for the machine learning model within a search space bounded by the first sparsity ratio; and
   generating a compressed version of the machine learning model having the second sparsity ratio.

2. The computer-implemented method of claim 1, further comprising generating a different compressed version of the machine learning model for each iteration performed by the Bayesian optimizer to select the first and second sparsity ratios.

3. The computer-implemented method of claim 2, wherein generating the different compressed version of the machine learning model comprises:
   performing a learning step that trains the machine learning model with a quadratic regularization term; and
   performing a compression step that compresses the machine learning model to have a specified sparsity ratio at a given iteration of the Bayesian optimizer.

4. The computer-implemented method of claim 3, wherein the learning step and the compression step are repeated until a stopping criterion is met.

5. The computer-implemented method of claim 2, wherein the Bayesian optimizer performs one or more iterations that randomly sample the first and second sparsity ratios for the machine learning model.

6. The computer-implemented method of claim 2, wherein the Bayesian optimizer performs one or more iterations that select the first sparsity ratio based on an implicit level set upper confidence bound (ILS-UCB) sampling criterion.

7. The computer-implemented method of claim 2, wherein the Bayesian optimizer performs one or more iterations that select the second sparsity ratio based on a confidence bound sampling criterion.

8. The computer-implemented method of claim 1, further comprising receiving the predefined objective function from a user.

9. The computer-implemented method of claim 1, wherein the predefined objective function comprises at least one of an evaluation rate for the machine learning model, a memory footprint, an evaluation time for the machine learning model, and a domain-specific objective.

10. The computer-implemented method of claim 1, wherein the Bayesian optimizer selects the second sparsity ratio based on a Gaussian process prior for the predefined objective function.

11. The computer-implemented method of claim 1, wherein generating the compressed version of the machine learning model comprises at least one of quantizing weights of the machine learning model and pruning a subset of the weights from the machine learning model.

12. A non-transitory computer readable medium storing instructions that, when executed by a processor, cause the processor to compress a machine learning model by performing the steps of:
    determining, by a Bayesian optimizer, a first sparsity ratio associated with a limit on an accuracy loss caused by compressing the machine learning model;
    selecting, by the Bayesian optimizer, a second sparsity ratio that optimizes a predefined objective function for the machine learning model within a search space bounded by the first sparsity ratio; and
    generating a compressed version of the machine learning model having the second sparsity ratio.

13. The non-transitory computer readable medium of claim 12, wherein the steps further comprise generating a different compressed version of the machine learning model for each iteration performed by the Bayesian optimizer to select the first and second sparsity ratios.

14. The non-transitory computer readable medium of claim 13, wherein generating the different compressed version of the machine learning model comprises:
    performing a learning step that trains the machine learning model with a quadratic regularization term; and
    performing a compression step that compresses the machine learning model to have a specified sparsity ratio at a given iteration of the Bayesian optimizer.

15. The non-transitory computer readable medium of claim 13, wherein the Bayesian optimizer performs one or more iterations that randomly sample the first and second sparsity ratios for the machine learning model.

16. The non-transitory computer readable medium of claim 13, wherein Bayesian optimizer performs a first series of iterations that select the first sparsity ratio based on an implicit level set upper confidence bound (ILS-UCB) sampling criterion and a second series of iterations that select the second sparsity ratio based on a confidence bound sampling criterion.

17. The non-transitory computer readable medium of claim 12, wherein the steps further comprise receiving the predefined objective function and the limit on the accuracy loss from a user.

18. The non-transitory computer readable medium of claim 12, wherein the predefined objective function comprises at least one of an inference throughput, a memory footprint, a latency, and a domain-specific objective.

19. The non-transitory computer readable medium of claim 12, wherein generating the compressed version of the machine learning model comprises at least one of quantizing weights of the machine learning model and pruning a subset of the weights from the machine learning model.

20. A system, comprising:
    a memory storing instructions; and
    a processor for executing the instructions to:
        determine, by a Bayesian optimizer, a first sparsity ratio associated with a limit on an accuracy loss caused by compressing the machine learning model;
        select, by the Bayesian optimizer, a second sparsity ratio that optimizes a predefined objective function for the machine learning model within a search space bounded by the first sparsity ratio; and
        generate a compressed version of the machine learning model having the second sparsity ratio.

* * * * *